US005525000A

United States Patent [19]

Belobraydich et al.

[11] Patent Number: 5,525,000

[45] Date of Patent: Jun. 11, 1996

[54] RELEASABLE COUPLING ASSEMBLY

[75] Inventors: Todd Belobraydich, Downers Grove; Jeffrey A. Williams, Westmont, both of Ill.

[73] Assignee: Dicke Tool Company, Downers Grove, Ill.

[21] Appl. No.: 425,349

[22] Filed: Apr. 19, 1995

Related U.S. Application Data

[63] Continuation of Ser. No. 384,673, Feb. 3, 1995, abandoned, which is a continuation of Ser. No. 73,720, Jun. 8, 1993, abandoned, which is a continuation-in-part of Ser. No. 713,805, Jun. 12, 1991, Pat. No. 5,231,778.

[51] Int. Cl.[6] .............. G09F 15/00; F16B 7/04

[52] U.S. Cl. .............. 403/102; 403/110; 403/95; 403/330; 403/325; 40/610

[58] Field of Search .............. 16/115, 114 R, 16/110 R, DIG. 41; 5/111, 114, 627, 201, 202; 81/177.2, 180.1, 184, 185.2; 248/188, 409, 414, 166; 403/102, 100, 110, 95, 91, 83, 325, 321, 330; 40/606, 607

[56] References Cited

U.S. PATENT DOCUMENTS

| | | | |
|---|---|---|---|
| 385,717 | 7/1888 | Kibbe | 81/177.2 |
| 451,908 | 5/1891 | Bird et al. | 5/202 |
| 572,201 | 12/1896 | Hausmann | 403/83 |
| 691,050 | 1/1902 | Dronne . | |
| 1,099,079 | 6/1914 | Alden | 81/180.1 |
| 1,511,738 | 10/1924 | Lownsbery | 16/115 |
| 2,025,004 | 12/1935 | Shearer . | |
| 2,389,811 | 11/1945 | Ozlek | 16/DIG. 41 |
| 2,652,736 | 9/1953 | Kiene | 16/114 R |
| 2,917,813 | 12/1959 | Ackermann et al. . | |
| 3,620,496 | 11/1971 | Bolt et al. . | |
| 3,677,511 | 7/1972 | Dicke . | |
| 3,899,843 | 8/1975 | Doyle et al. . | |
| 4,019,271 | 4/1977 | Latimer . | |
| 4,059,915 | 11/1977 | Owens . | |
| 4,232,467 | 11/1980 | Stewart . | |
| 4,288,053 | 9/1981 | Sarkisian . | |
| 4,309,836 | 1/1982 | Knapp . | |
| 4,433,935 | 2/1984 | Main et al. . | |
| 4,490,934 | 1/1985 | Knapp . | |
| 4,507,887 | 4/1985 | Seely . | |
| 4,548,379 | 10/1985 | Seely et al. | 248/624 |
| 4,569,499 | 2/1986 | Seely | 248/624 |
| 4,572,473 | 2/1986 | Seely | 248/624 |
| 4,593,879 | 6/1986 | Seely et al. . | |
| 4,644,600 | 2/1987 | Fugate | 81/177.2 |
| 4,691,892 | 9/1987 | Grewe et al. . | |
| 4,694,601 | 9/1987 | Dicke et al. . | |
| 4,886,232 | 12/1989 | Dicke et al. . | |
| 4,954,008 | 9/1990 | Dicke et al. . | |
| 4,960,014 | 10/1990 | Kelley | 81/177.2 |

FOREIGN PATENT DOCUMENTS

| | | | |
|---|---|---|---|
| 820713 | 9/1959 | United Kingdom | 5/627 |

*Primary Examiner*—Anthony Knight
*Attorney, Agent, or Firm*—Fitch, Even, Tabin & Flannery

[57] ABSTRACT

A releasable coupling assembly is provided for rib members or other members having a flat stock or bar-like configuration. The releasable coupling is provided for members which are at least partially overlapping one another, with the opposing mating surfaces of the members preferably being planar. One member carries a retaining clip defining a pocket for receiving the other rib member. Various embodiments are provided in which moveable or stationary pins extend into the pocket to engage the cooperating rib member to engage the rib member to prevent dislodgement from the overlapping condition.

4 Claims, 5 Drawing Sheets

Fig. 1
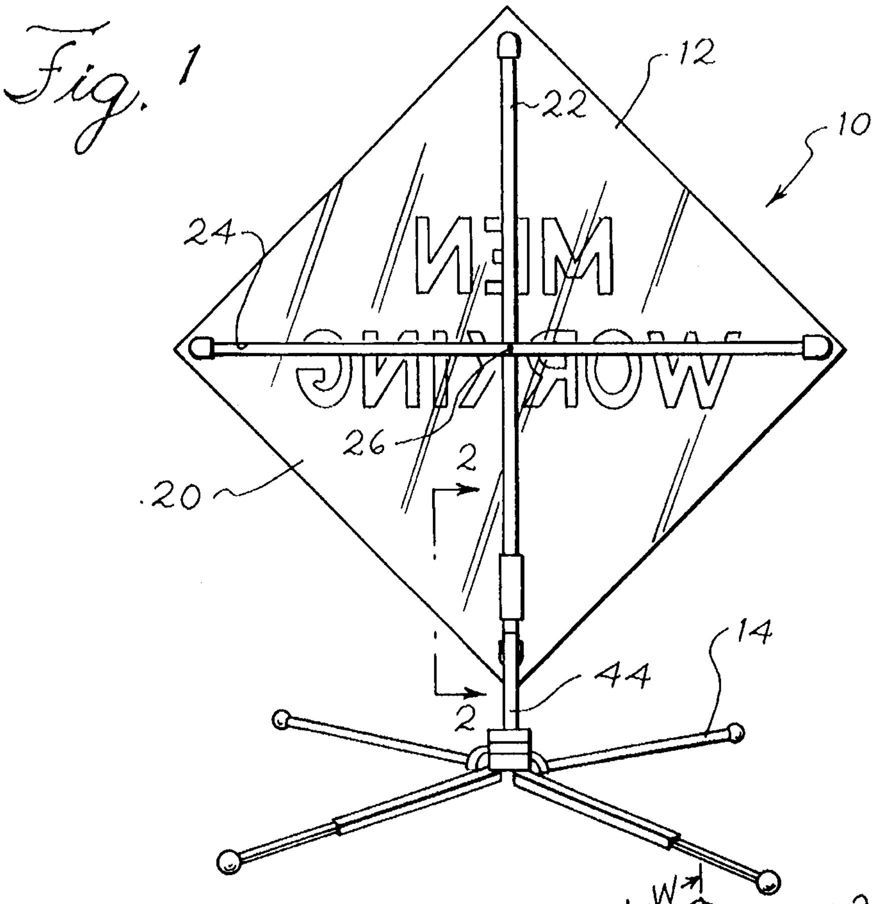
Fig. 2
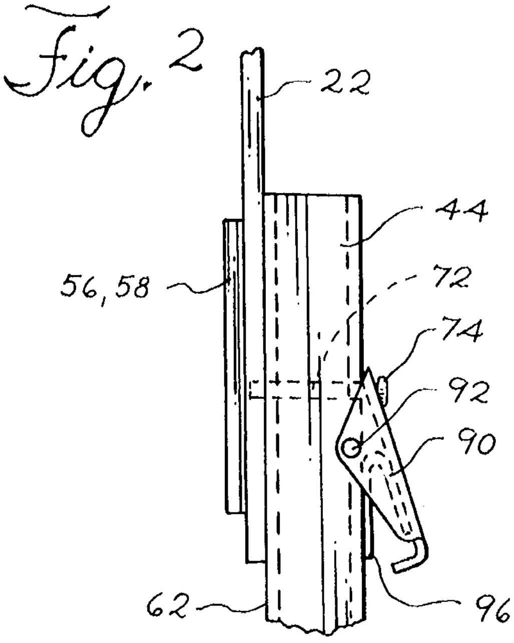
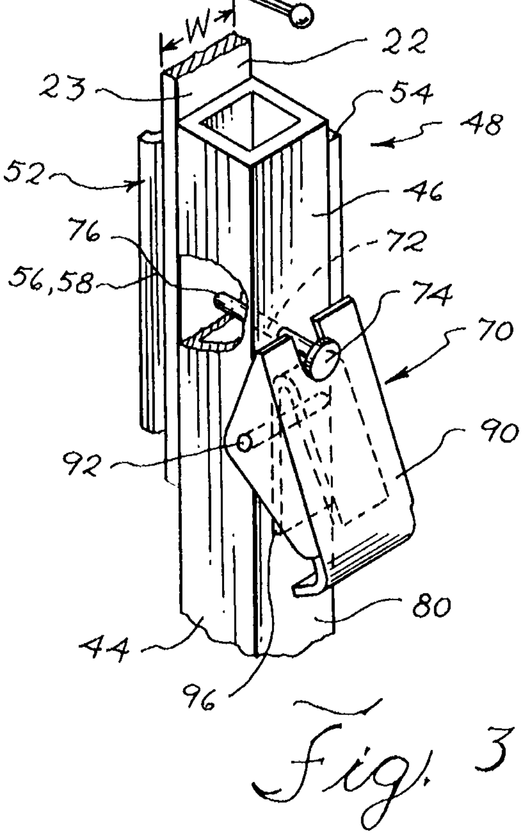
Fig. 3

RELEASABLE COUPLING ASSEMBLY

CROSS REFERENCE TO RELATED APPLICATIONS

This application is a File-Wrapper-Continuation of application Ser. No. 08/384,673, filed Feb. 3, 1995, now abandoned, which was a File-Wrapper-Continuation of application Ser. No. 08/073,720, filed Jun. 8, 1993, now abandoned, which was a Continuation-In-Part of application Ser. No. 07/713,805, filed Jun. 12, 1991, now U.S. Pat. No. 5,231,778 .

BACKGROUND OF THE INVENTION

1. Field of the Invention

The present invention pertains to equipment such as sewer rods or portable signs typically assembled for use on a temporary basis. The present invention also pertains to the releasable, preferably temporary, coupling of these devices.

2. Description of the Related Art

Signs are used for a wide variety of applications, both indoors and outdoors. One application, for example, is to post a temporary warning or alert notice adjacent a construction site or roadside work location. As will be appreciated by those skilled in the art, signs intended for outdoor use must be carefully designed to accommodate wind loadings which can be quite substantial, especially for larger sign panels, 48 inches or larger. In order to be commercially attractive, the sign should be capable of set-up by a single worker, even in a wide variety of weather and climate conditions. For example, a sign should be capable of ready assembly even in cold conditions which reduce manual dexterity, or in applications where gloves and other hand protection must be worn. It is important in temporary applications that a sign be reusable, storable in a compact space and readily erected on demand. In particular, it is important that the sign be easily displayed at the beginning of a work session without elaborate preparations, and thereafter stowed away when the warning or alert is no longer needed.

Erection of signs and signage components typically involves the coupling of vertical support or mast members to create a sign of extended height. Typically, multiple mast members are temporarily coupled together, for example, by telescopic interfitting. Other types of devices, such as tools used outdoors, also require manipulation in adverse conditions, such as cold weather. Coupling for such tools should be quickly and easily operated, preferably without requiring workers to remove gloves and other protective clothing. One example of such tooling is a so-called "duct rod" used for pulling cables and other facilities through subterranean conduit or duct runs.

SUMMARY OF THE INVENTION

It is an object according to principles of the present invention to provide improved coupling arrangements for signage, tools and other devices, especially those which are set up on a temporary basis.

Another object according to principles of the present invention is to provide coupling arrangements which have a minimum number of inexpensive parts, which are economically constructed, and which require a minimum amount of training for their operation.

These and other objects according to principles of the present invention are provided in a releasable coupling assembly, comprising:

a first member having a free end to be coupled to a second member;

a second member having a free end to be coupled to the first member and defining an aperture;

alignment means carried by the free end of the first member and cooperating with the first member to form a pocket therewith for rotatingly receiving the free end of the second member so as to align the free ends of the first and second members in partially overlying relationship, with the aperture in the pocket;

pin means carried by the free end of the first member;

pin mounting means carried by the free end of the first member for moving the pin means into and out of the pocket so as to be moved into and out of locking engagement with portions of the second member defining the aperture; and the pin means, when received in the aperture so as to be in locking engagement with portions of the second member defining the aperture, preventing unintentional decoupling of the first and second members.

BRIEF DESCRIPTION OF THE DRAWINGS

FIG. 1 is a front elevational view of a sign assembly according to principles of the present invention;

FIG. 2 is a fragmentary side elevational view thereof;

FIG. 3 is a fragmentary perspective view thereof;

DETAILED DESCRIPTION OF THE PREFERRED EMBODIMENTS

Figure 4:
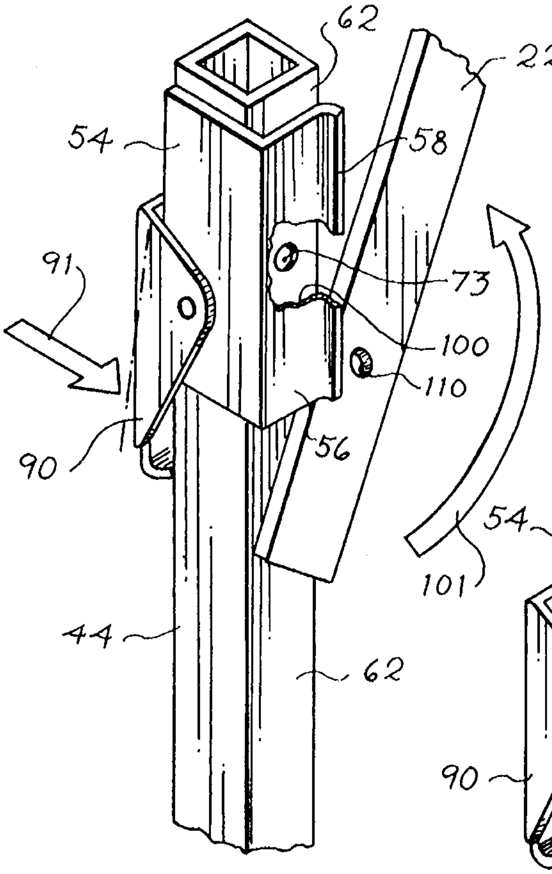
FIG. 4 is a fragmentary perspective view thereof, shown from the rear side.

Referring now to the drawings, and initially to FIGS. 1–7, a sign assembly is generally indicated at 10. Sign assembly 10 includes a sign panel arrangement 12 and a mounting base 14. The sign panel arrangement 12 includes a sign panel 20 made of flexible material, such as fabric or plastic, and a pair of stiffening ribs 22, 24, which are pinned together at 26 in a conventional manner. As can be seen in FIG. 3, rib 22 (as is also true with a substantially similar rib 24) has an elongated, preferably rectangular, cross section having a generally flat mating surface 23. The width of the rib is preferably greater than the rib thickness, although this is not always necessary in some instances. The opposed major surface of rib 22, that surface opposite mating surface 23, is of course also planar, but could in some embodiments be nonplanar, such as concavely curved, for example. The sign panel arrangement 12 is commercially available from the assignee of the present invention, as panel components of a Model 3000 sign system.

The mounting base 14 includes a mast 44, preferably of square channel construction. Mast 44 has an upper free end 46 where releasable attachment apparatus, generally indicated at 48, is located. The attachment apparatus includes a mounting clip 52 which is mounted to mast 44 adjacent the free end 46, using conventional techniques such as rivets or welding. The mounting clip 52 includes a sidewall 54 and a front wall 56 having an upturned free end 58 which cooperate with the mast to serve as an alignment means, as will be seen. The front wall 56 is preferably of generally planar configuration, extending generally parallel to a front mating surface 62 of mast 44 (see FIG. 4). The front wall 56 is preferably at least twice as long as the rib width W (see FIG. 3).

Figure 5:
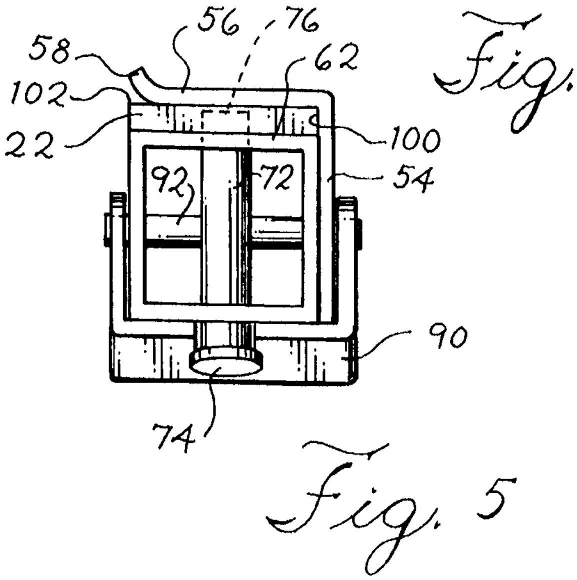
FIG. 5 is a top plan view thereof.

Referring again to FIG. 3, the releasable attachment apparatus 48 includes a lever-operated locking mechanism generally indicated at 70. The locking mechanism 70 includes a spring-biased locking pin 72 having a head 74 and a free end 76. Locking pin 72 is inserted into an aperture in a rear surface 80 of mast 44 so that the free end 76 extends through an aperture 73 in the mating face 62 so as to protrude beyond the mast 44, as can be seen in FIGS. 2 and 5. A manually engagable lever or handle 90 is pivotably mounted to mast 44 by a pin 92. Pin 72 is held captive by the upper portion of handle 90. A leaf spring 96 urges the top of handle 90 toward mast 44, biasing locking pin 72 toward a fully extended position (illustrated in FIGS. 2 and 5, for example) with the free end 76 protruding beyond mast 44 so as to enter a pocket 100 formed by mating face 62 of mast 44, a portion of sidewall 54 and front wall 56 of mounting clip 52. As can be seen in FIG. 5, for example, pocket 100 has an opening 102 adjacent the outwardly flared free end 58 of mounting clip 52. The rib member 22 is inserted through opening 102 so as to enter pocket 100. As mentioned above, spring 96 urges the free end 76 of the locking pin 72 into pocket 100, and as can be seen in FIG. 5, the pin is located at a position adjacent front wall 56. Referring to FIG. 4, a pin-receiving aperture or locating hole 110 is formed in rib 22 for receiving the free end 76 of the locking pin in the manner illustrated in FIGS. 2 and 5, for example.

Figure 6:
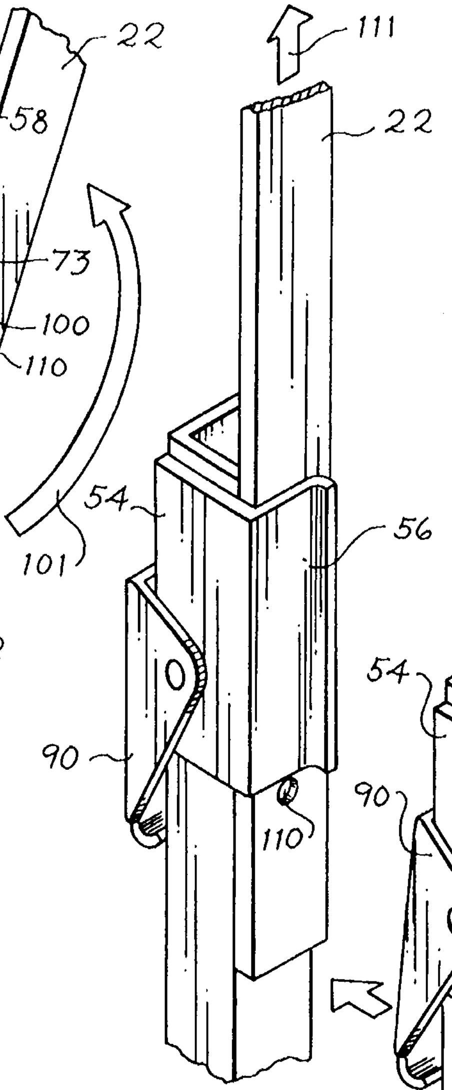
FIG. 6 is a fragmentary perspective view thereof, shown in a partially assembled condition.
Figure 7:
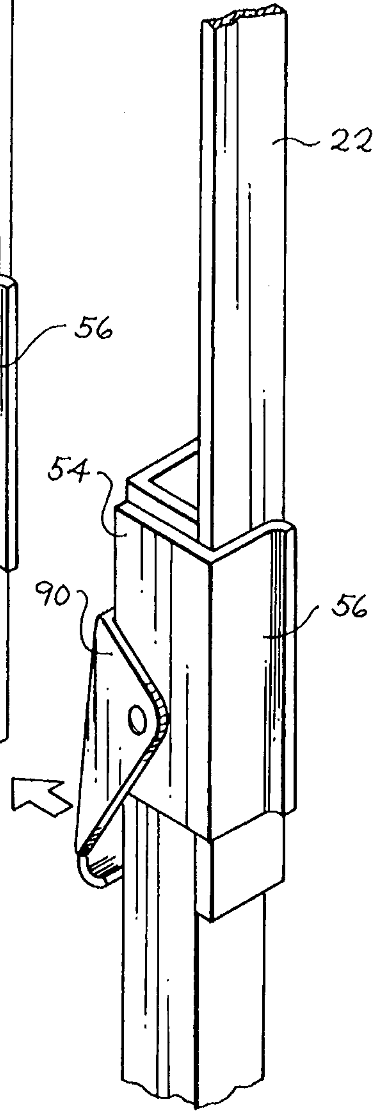
FIG. 7 is a fragmentary perspective view thereof, shown in a fully assembled condition.

Turning now to FIGS. 4–7, the locking of rib 22 is quickly and easily accomplished in the manner illustrated. As indicated in FIG. 4, it is generally preferred that the handle 90 be compressed in the direction of arrow 91 so as to retract the locking pin from pocket 100. Rib 22 is then inserted into pocket 100 with a swinging motion indicated by arrow 101, to achieve the partially inserted condition illustrated in FIG. 6. If desired, rib 22 can be inserted in a lateral (horizontal) direction toward sidewall 54, if desired. Further, the free end 76 of locking pin 72 can be angled such that insertion of rib 22 forces the locking pin to a retracted position, without requiring handle 90 to be depressed. In either event, it is preferred that rib 22 be inserted such that, with rib 22 fully inserted in pocket 100, hole 110 is located to one side of the locking pin 72. For example, as shown in FIG. 6, the hole 110 is located below the locking pin 76, thus providing a ready visual indication to an operator that rib 22 must be raised in the direction of arrow 111 to complete the locking engagement. By lessening manual pressure on handle 90, or alternatively with complete release of handle 90, the bias force of spring 96 causes the locking pin to press against rib 22. With an upward pull on rib 22, hole 110 is brought into registry with hole 73 of mast 44 (see FIG. 4), thus allowing pin 72 to pass beyond aperture 73 into hole 110, fully locking the rib 22 in pocket 100, in the manner illustrated in FIGS. 2 and 5, for example. FIG. 7 shows the rib in the fully locked position.

As will be appreciated by those in the equipment manufacturing art, the releasable locking arrangement shown in FIGS. 1–7 can be applied to other types of equipment. Lighting equipment mounted on a base, telescoping extendable handles for tree pruners and the like, horizontally extending beams used with production equipment, such as an extendable arm to hold a sensor above a conveyor belt, for example, can all employ releasable locking arrangements according to principles of the present invention.

The present invention preferably employs two partially overlapping elongated members whose opposed mating surfaces are preferably flat, or at least complementarily shaped. However, other arrangements are also contemplated by the present invention. For example, the face 52 of mast 44 could have a central concave trough or depression extending throughout the end portion of the mast. Rib 22 could have a complementarily shaped and sized convexly curved surface to be received in the concave recess of mast 44. Other arrangements are also possible.

Figures 8, 9:
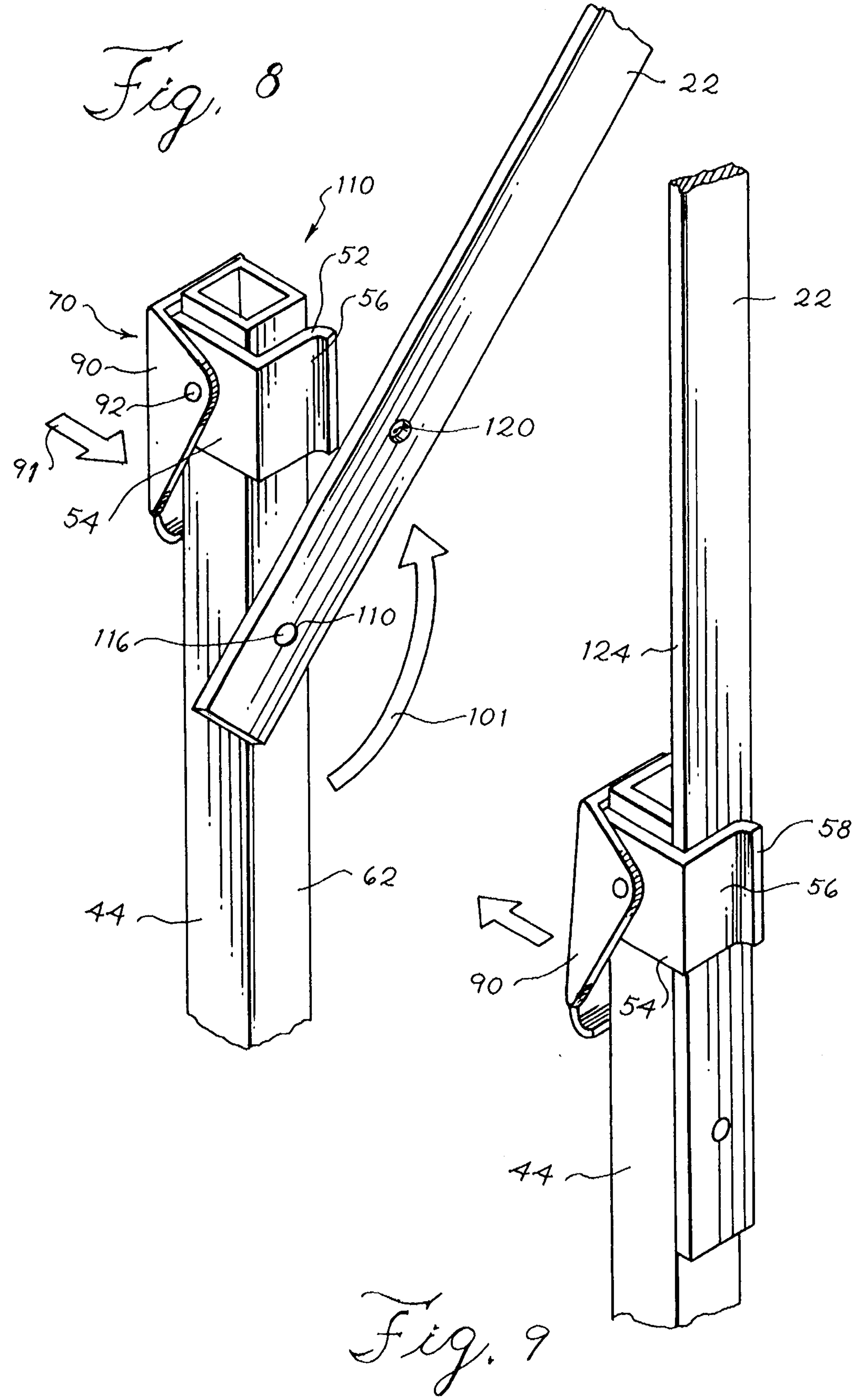
FIG. 8 is a fragmentary perspective view of an alternative coupling arrangement illustrating principles according to the present invention.
FIG. 9 is a fragmentary perspective view similar to that of FIG. 8, but showing a fully assembled condition.

Referring now to FIGS. 8 and 9, an alternative embodiment of a releasable coupling mechanism is generally indicated at 110. The releasable coupling mechanism employs the same locking mechanism 70 as that described above with reference to FIGS. 1–7. The mounting clip 52 described above is also employed, as is the rib member 22 having a hole 110 adjacent its free end. Releasable coupling assembly 110 further includes a stationary pin 116 extending from face 62. Pin 116 is preferably secured to mast 44 using conventional techniques. For example, pin 116 can be staked to the hollow tubing of mast 44, or it can be welded or riveted to the tubing in a known manner. Other mounting arrangements for the stationary pin 116 are also possible.

Rib 22 is initially aligned in the manner indicated in FIG. 8, with hole 111 receiving stationary pin 116. A second hole 120 is formed in rib 22, spaced from aforementioned hole 110. The spacing between holes 110, 120 of rib 22 correspond to the spacing of stationary pin member 116 to the moveable pin member 72 mounted thereabove (not visible in FIGS. 8 or 9). In the preferred mode of operation, handle 90 is depressed in the direction of arrow 91 and rib 22 is swung to a mated position in the direction of arrow 101. When rib 22 is aligned with mast 44, aperture 120 is aligned with the locking pin and pressure on handle 90 is released, as indicated, allowing the locking pin to engage rib 22. Further, as a convenient alignment of rib 22 to mast 44, the sidewall 54 of clip 52 is preferably positioned so that it contacts the edge 124 of rib 22, preventing further rotation in the direction of arrow 101. A quick, easy, and stable locking between members 22 and 44 is thereby provided.

As mentioned above, the partially overlapping members 22, 44 need not be associated with the sign assembly, but can be used with virtually any type of equipment requiring a partially overlapping, interlocking engagement of two members. The present invention is particularly adapted to temporary releasable couplings, and, as will now be appreciated, by simply depressing handle 90 and rotating rib 22 out of pocket 100, the two members 22, 44 are quickly and easily uncoupled. As with the preceding embodiment, the members 22, 44 have opposed mating faces throughout the overlapping portion illustrated in FIG. 9. In the preferred embodiment, these mating faces are planar, as indicated above. However, the mating faces need not be planar, but can have multiple ribs, dimples or other surface disruptions, if desired.

Figures 10, 11:
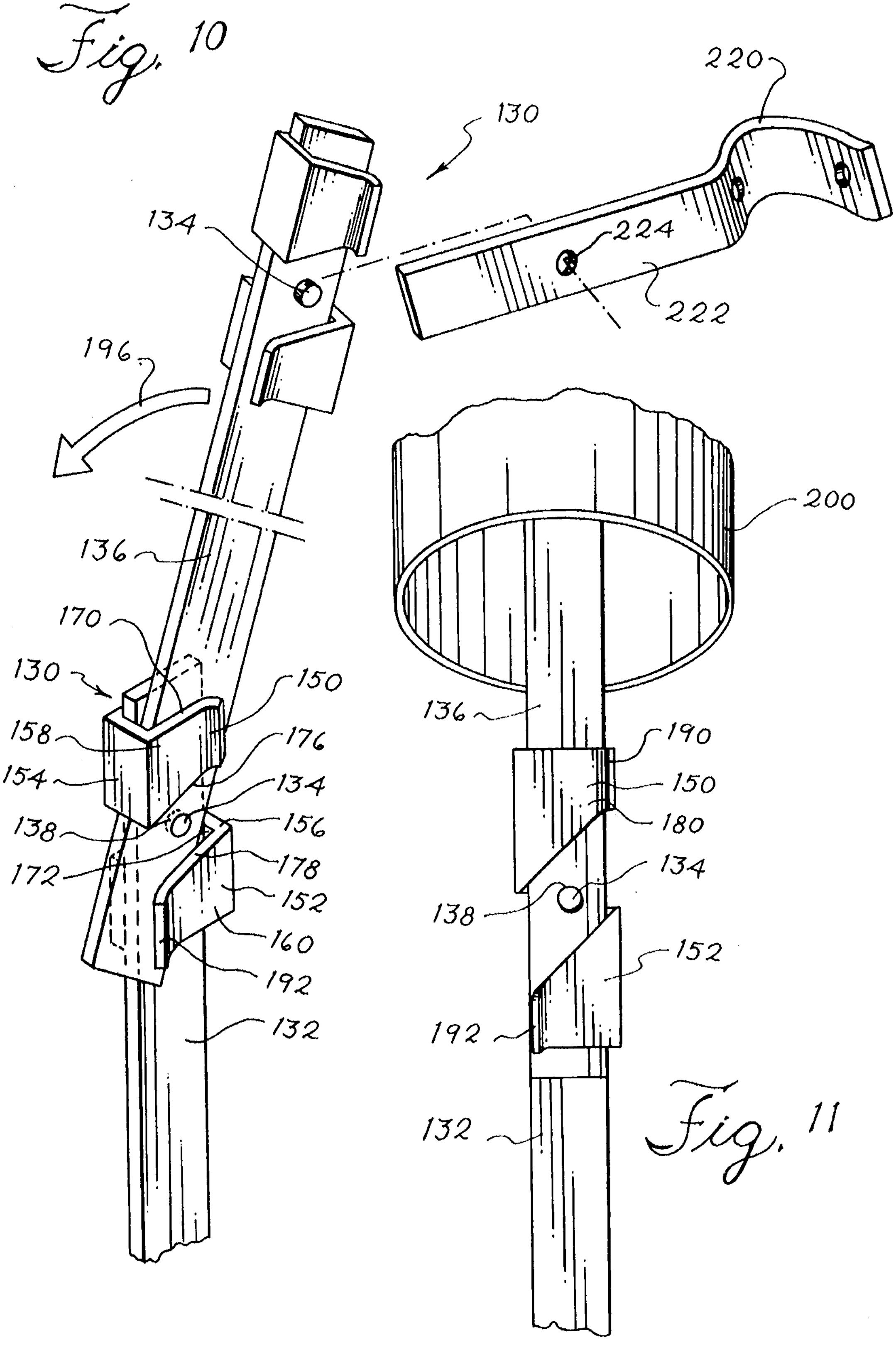
FIG. 10 is a fragmentary perspective view of an alternative coupling arrangement illustrating principles according to the present invention.
FIG. 11 shows the coupling arrangement of FIG. 10 entering a conduit.

Turning now to FIGS. 10 and 11, another embodiment of a releasable coupling arrangement according to principles of the present invention is shown. The releasable coupling arrangement generally indicated at 130 joins first and second flat stock, bars or ribs together. Two examples of the releasable coupling arrangement are shown in FIG. 10. As shown at the lower end of FIG. 10, a first rib 132 has a generally rectangular configuration with a stationary pin 134 mounted at one end thereof. A second rib member 136 has, at its lower end, an aperture 138 for receiving the pin 134 in the manner shown. The releasable coupling arrangement 130 further includes a pair of mounting clips 150, 152 which are mounted to bar 132 adjacent its free end, using conventional techniques such as spot welding. The mounting clips 150, 152 include sidewalls 154, 156 and front walls 158, 160 which extend generally parallel to the mating face of rib 132. The clip walls 158, 160 are spaced from the mating surface of rib 132 so as to form rib-receiving pockets 170, 172 for receiving the lower free end of rib 136. The walls 158, 160 include opposed, angled ends 176, 178 which are spaced apart in the manner illustrated in FIG. 11 so as to receive rib 136 when oriented at an angle to the central axis of rib 132. As will be appreciated, the pockets formed by clip members 150, 152 open in opposite directions.

The rib-receiving gap 180 formed between the clip members 150, 152, as can be seen in FIG. 11, allows the rib 136 to be pressed against the upper free end of rib 132. Such interengagement between the ribs 132, 136, of course, requires registration of stationary pin 134 and the complementary hole 138 formed in rib 136. The clip members 150, 152 have outwardly turned free ends 190, 192 to facilitate the simultaneous insertion of rib 136 into the pockets formed by clips 150, 152, with rotation in the direction of arrow 196, i.e., rotation of rib 136 about pin 134. Preferably, the sidewalls 154, 156 are positioned so as to prevent over-rotation of rib 136 with respect to rib 132, thus providing a convenient alignment between the rib members 132, 136.

Locking of the rib members in the position shown in FIG. 11 is optional, depending upon the intended use. For example, as illustrated in FIG. 11, the members enter a hollow conduit 200 which prevents relative rotation of the members to an extent sufficient to decouple the members, although, obviously, some relative rotation is possible without locking of the rib members in the desired overlapping position. For other applications, a variety of locking provisions can be made. For example, the front walls 150, 152, illustrated in FIG. 11, can have their lateral width extended such that the radius portion formed by the upturned free ends 190, 192 would engage minor lateral edges of the rib member 136. Thus, in a first embodiment, the clip member 150 could be made of spring material with the upturned free end 190 bent toward the mating face of rib 132 so as to present an opening too narrow for the free insertion of rib 136. The clip 150 would nonetheless be readily deflectable with insertion pressure. Rib 136 would be rotated about pin 134 until a first lateral edge is brought in contact with sidewall 154 of the clip, preventing further rotation. At this point, the spring-biased free end 190 would be allowed to cam over an outside corner of rib 136, so as to at least partly engage the opposed minor edge of rib 136. If desired, clip 152 could be similarly configured to provide the same "pinching" effect as that just described. Other locking arrangements are also possible and may be combined with the releasable coupling arrangement described above, if desired. For example, the rib 136 could be provided with a cylinder having an internal diameter sufficient to receive clip member 150. Upon the completed engagement shown in FIG. 11, the cylinder could be slipped over clip 150, preventing disengagement of the rib member 136 from the pocket formed by clip member 150.

As shown in FIG. 10, the same releasable coupling arrangement 130 is repeated at the upper end of rib 136. If desired, additional identical rib members 136 can be mated end-to-end to form a tool, such as a duct rod or sewer rod, of desired length. As illustrated in FIG. 10, a generalized tool head 220 includes a rib portion 222 defining a hole 224 for receiving the stationary pin 134 located at the upper end of rib 136. The coupling of rib members 22 and the upper end of rib 136 is the same as that described above for the lower end of rib 136 and rib 132.

Figure 12:
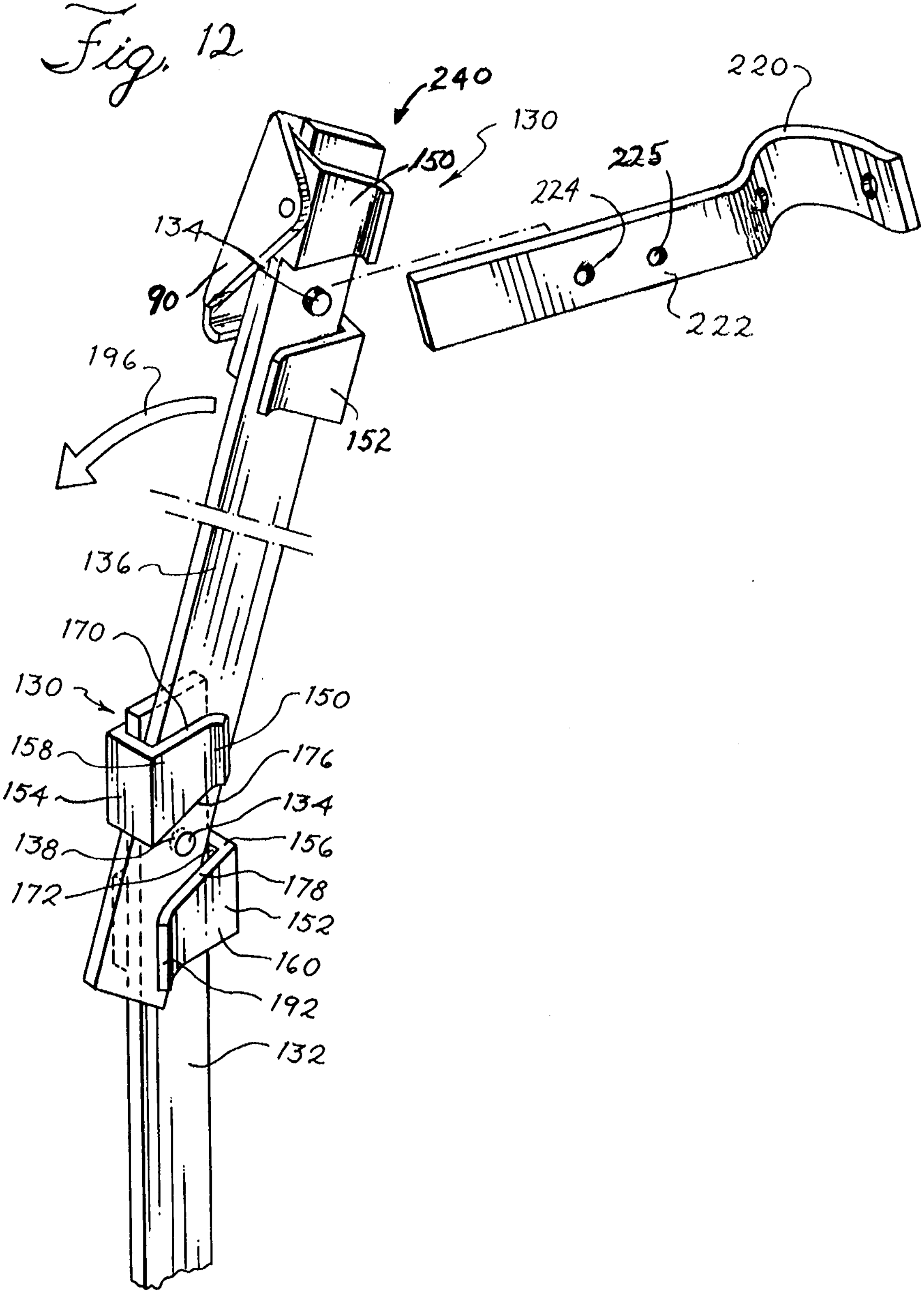
FIG. 12 is a fragmentary perspective view of another alternative coupling arrangement illustrating principles according to the present invention.

FIG. 12 shows a releasable coupling arrangement 240 similar to that of FIG. 10 but with the addition of a spring-loaded locking pin operable by the handle 90 illustrated in FIG. 2. The upper clip member 150 generally resembles the clip member 56 shown in FIG. 9 and cooperates in the same manner with a locking pin (not visible in FIG. 12) and its operating handle 90. The tool member 220 in FIG. 12 is provided with a second aperture 225 for receiving the locking pin (operated by handle 90) which opposes a bias spring (not visible in FIG. 12) to withdraw the locking pin out of contact with tool member 220. Locking of the tool member to the second rib member 136 is carried out as described above with reference to FIGS. 8 and 9. If desired, pin 134 can be omitted.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A sign panel mounting device for holding a sign panel upright comprising:

a mast having an upper end for holding the sign panel and a lower end, the lower end having an aperture therein;

an upright support member for supporting the lower end of the mast and for holding the mast in an upright position and having a substantially vertical wall thereon;

a clip carried by the support member for detachable connection to the lower end of the mast to assist in holding the mast in an upright position;

a portion of the clip spaced from the substantially vertical wall of the support member to form a pocket between the clip and the vertical wall of the support member;

the portion of the clip and the vertical wall of support member defining a vertical open side end to allow the mast to be inserted at an inclined position relative to the upright support member and to be pivoted in the pocket from the inclined position to the upright position;

the lower end of the mast when in the upright position in the pocket being disposed between the portion of the mounting clip and the adjacent wall of support member; and locking means on the support member to prevent movement of the mast out of said pocket, said locking means comprising a locking pin having a central axis and movably mounted to said support member for movement along said central axis and spring bias means for urging said locking pin in a first direction through the aperture in the mast.

2. A sign panel mounting device as recited in claim 1 wherein the clip at the vertical open side has an out-turned portion to introduce the mast into the pocket.

3. A sign panel mounting device as recited in claim 1 further comprising a manually engageable handle means comprising a manually engageable lever mounted for rocking and having a free end connected to the locking pin so as to move said locking pin back and forth, toward and away from the mast.

4. A sign panel mounting device as recited in claim 1 further comprising a manually engageable handle means comprising a manually engageable lever mounted for rocking and having a free end connected to the locking pin so as to move said locking pin back and forth, toward and away from the mast.

* * * * *